United States Patent
Hwang

[11] Patent Number: 5,805,151
[45] Date of Patent: Sep. 8, 1998

[54] RASTER CONTOLLER

[75] Inventor: Ho-Dae Hwang, Seoul, Rep. of Korea

[73] Assignee: SamSung Electronics Co., Ltd., Suwon, Rep. of Korea

[21] Appl. No.: 648,296

[22] Filed: May 15, 1996

[30] Foreign Application Priority Data

May 15, 1995 [KR] Rep. of Korea .................. 1995 11879
May 11, 1996 [KR] Rep. of Korea .................. 1996 15647

[51] Int. Cl.⁶ ..................................................... G09G 5/00
[52] U.S. Cl. ........................... 345/213; 345/211; 345/212
[58] Field of Search ............................. 345/211–215, 10, 345/730; 348/730–372; 395/750.03, 750.07, 750.08

[56] References Cited

U.S. PATENT DOCUMENTS

| | | | |
|---|---|---|---|
| 4,626,837 | 12/1986 | Priestly ..................................... | 340/723 |
| 4,788,540 | 11/1988 | Tokumitsu et al. ...................... | 340/789 |
| 4,926,166 | 5/1990 | Fuijsawa et al. ........................ | 340/717 |
| 5,389,952 | 2/1995 | Kikinis .................................... | 345/212 |
| 5,555,032 | 9/1996 | Kung ........................................ | 345/211 |
| 5,579,025 | 11/1996 | Itoh ......................................... | 345/213 |
| 5,586,333 | 12/1996 | Choi et al. .............................. | 395/750 |

Primary Examiner—Steven J. Saras
Assistant Examiner—David L. Lewis
Attorney, Agent, or Firm—Robert E. Bushnell, Esq.

[57] ABSTRACT

A raster controller having a microprocessor for storing a preset video signal of red, green and blue components, a clock generator for generating a clock signal of a constant time period, a synchronization and blocking signal generator for receiving a clock signal output from the clock generator and a video signal output from a microprocessor so as to generate a synchronization signal and a blanking signal, a multiplexer for inputting a synchronizing signal generated from the synchronization and blanking signal generator and a horizontal synchronizing signal supplied from a video signal generator in a computer system, responsive to a raster control signal, and for selectively generating a synchronization signal, an AND gate for inputting a blanking signal output from the synchronization and blanking signal generator to perform a logic product operation and a switch, responsive to the raster control signal, for inputting a signal output from the AND gate so as to switch on/off a video signal output. As a result, without a signal input from external video signal generator in a computer system, the raster controller enables various tests of performance of a monitor incorporating the instant invention in the manufacturing process.

8 Claims, 6 Drawing Sheets

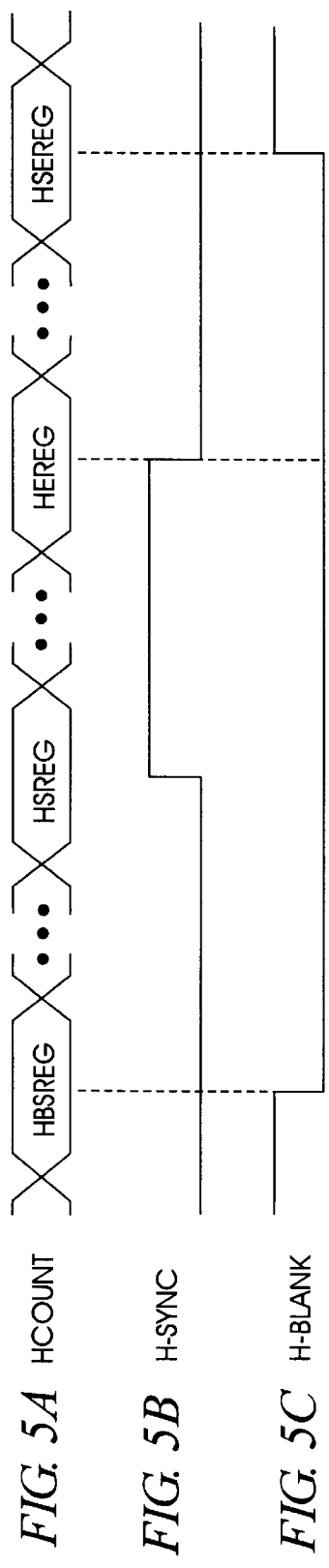
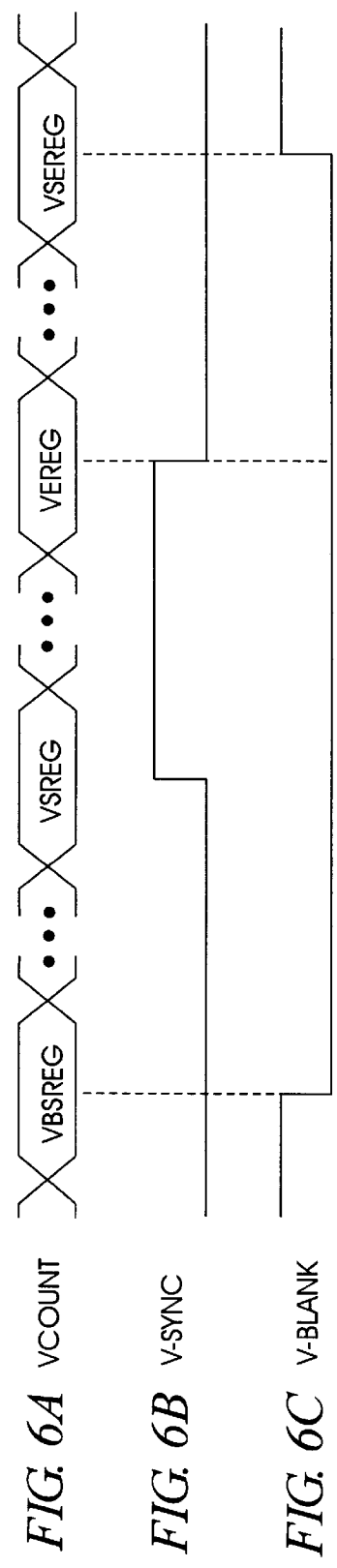
FIG. 5A HCOUNT
FIG. 5B H-SYNC
FIG. 5C H-BLANK
FIG. 6A VCOUNT
FIG. 6B V-SYNC
FIG. 6C V-BLANK

RASTER CONTOLLER

CLAIM OF PRIORITY

This application makes reference to, incorporates the same herein, and claims all benefits accruing under 35 U.S.C. §119 from on application for RASTER CONTROL CIRCUIT earlier filed in the Korea Industrial Property Office on the 15th of May 1995 and there assigned Serial No. 95-11879 and an application for RASTER CONTROLLER filed on the 11th of May 1996 and there assigned Serial No. 96-15647 by that Office.

BACKGROUND OF THE INVENTION

The present invention relates generally to a raster controller for a monitor, and more particularly to a raster controller for a monitor capable of generating a set of video signals (R,G,B) as well as a pair of horizontal and vertical synchronizing signals (H-Sync/V-Sync) within the monitor itself, and thereby enable performance of an image adjustment and an image quality test, and display of video signals on a screen of a monitor operating in a display power management system (DPMS) mode.

It is known that a raster denotes a pictorial image consisting of a scanning line which is a deflected electron beam emitted from an electron gun on a screen of a cathode ray tube (CRT) in a monitor. With an exemplar of a raster adjustment circuit conventionally employed in a monitor, when no signals for vertical and horizontal synchronization (H-Sync/V-Sync) nor a video signal having red, green and blue components are supplied from a video signal generator in a computer system, an output of a horizontal oscillation circuit is capable of being utilized to obtain a horizontal synchronizing signal and an output of vertical oscillation circuit is, in the same manner, capable of being utilized to obtain a vertical synchronizing signal for use in a monitor. A video signal may be adjusted by an on/off operation, to cause output of respective color component signals, namely red, green and blue (R, G and B), of substantially the same voltage level, thereby supplying a full white signal to an electron gun of a cathode ray tube CRT. In a monitor display employing such a conventional raster adjustment circuit, a full white signal output is adapted only to display a constant image on the screen of a cathode ray tube, resulting in an pictorial image being displayed that is unclear and imprecise. I have noticed therefore, it is not possible to adjust such a pictorial image currently being displayed or to form an image pattern by using such a raster adjustment circuit conventionally employed as described above.

In addition, a monitor is designed to maintain a state of no signal when no video signals are input from a computer system. In a multi-mode monitor having a display power management system, responsive to the status of multiple DPMS modes, a mode is sequentially shifted from a standby mode to a suspend mode and then to an off mode. Consequently, when a power supply energizes the entire circuitry of a monitor which is supplied with no signal input from a video signal generator in a computer system, then an off mode may be maintained in a multi-mode monitor, otherwise a state of no-video signal would be maintained in a conventional monitor. I have found that these drawbacks prevent a user from determining whether a monitor in use is in a normal operation mode, and furthermore, require provision of an external signal input to a monitor during the manufacturing process, for example, particularly, in the process of reliability test and a hot burn-in test.

SUMMARY OF THE INVENTION

Accordingly, it is an object of the present invention to provide an improved raster controller for a monitor.

It is another object to provide a raster controller wherein a video signal R,G,B and horizontal and vertical synchronizing signals (H-Sync/V-Sync) are generated for use in a monitor, regardless of whether no signal is input from an external video signal generator in a computer system, thereby enabling an image adjustment and a variety of tests in manufacturing process.

It is still another object of the present invention to provide a raster controller in a monitor capable of displaying different image patterns according to a respective mode of a display power management system (DPMS) thereby enabling a user to recognize a DPMS mode currently being employed in the monitor.

It is yet another object of the present invention to provide a raster controller wherein a digital logic integrated circuit component device may easily be employed and a preferred embodiment is able to be incorporated into application specific integrated circuit (ASIC) configuration.

These and other objects may be achieved with a raster controller constructed with a microprocessor storing a RGB video signal in an internal read only memory (ROM), for inputting a respective signal of individual display power management system (DPMS) supplied from a DPMS circuit in a monitor; a clock generator for supplying a clock signal of constant period; a horizontal synchronizing and blanking signal generating circuit for inputting a clock signal from the clock generator and a first multiplexer inputting a horizontal synchronizing signal output from the horizontal synchronization and blanking signal generating circuit; and a circuit responsive to a horizontal synchronizing signal output from a video signal generator in a computer system, and responsive to a raster control signal, for selectively generating a horizontal synchronizing signal; a vertical synchronizing and blanking signal generating circuit for inputting a horizontal synchronizing signal output from the horizontal synchronizing and blanking signal generating circuit and a video signal output from a microprocessor and for generating a vertical synchronizing signal and a horizontal blanking signal; a second multiplexor M2 for inputting the vertical synchronization signal output from vertical synchronization and blanking signal generating circuit and a vertical synchronizing signal output from a video signal generator in a computer system, responsive to a raster control signal, and for selectively generating a vertical synchronizing signal; an AND gate for inputting a horizontal blanking signal output from the horizontal synchronization and blanking signal generating circuit and the vertical blanking signal output from vertical synchronization and blanking signal generating circuit so as to perform a logic product operation; and a switching element for receiving a signal output from the AND gate responsive to a raster control signal, and for switching on/off a RGB video signal output.

The microprocessor receives a DPMS mode signal from the DPMS circuit in the monitor and video signal (R,G,B) that has previously been stored in the ROM. A horizontal counter counts clock pulses being input from the clock generator which generates the clock signal in standard period, and a horizontal start register includes a start signal of the horizontal synchronizing signal (H-SYNC). A horizontal start comparator outputs the horizontal synchronizing start signal after comparing the horizontal count signal from the horizontal counter and horizontal synchronizing signal in the horizontal start register. A horizontal end register includes an end signal of the horizontal synchronizing signal, a horizontal comparator outputs the horizontal synchronizing signal after comparing the horizontal count signal from the horizontal counter and the horizontal synchronizing end signal in the horizontal end register. A flip-flop establishes an address area after getting the horizontal synchronizing start signal from the horizontal end comparator and the horizontal synchronizing end signal from the horizontal start comparator; a horizontal blanking start register portion includes a horizontal blanking start signal and gets a RGB video signal from the microprocessor, a horizontal blanking start comparing portion compares the horizontal count signal from the horizontal counter with horizontal blanking start signal from the horizontal blanking start register portion and stores the result of comparing at the horizontal blanking start register. A horizontal blanking end register portion includes a horizontal blanking end signal and gets the RGB video signal from the microprocessor. A horizontal blanking end comparing portion compares the horizontal count signal from the horizontal counter with the horizontal blanking end signal from the horizontal blanking end register portion and stores the result of the comparison at the horizontal blanking end register. A flip-flop controls the horizontal blanking video signal and gets the horizontal blanking start video signal from the horizontal blanking start register and the horizontal blanking end video signal from the horizontal blanking end register. A horizontal blanking start register portion includes a R-horizontal blanking start register storing the R (RED) signal from the RGB video signal output by the RGB microprocessor, a G-horizontal blanking start register getting a G (GREEN) signal from video signal (R,G,B) being output by the microprocessor, and a B-horizontal blanking start register getting a B (BLUE) signal from the video signal output from the microprocessor. A horizontal blanking end register portion includes a R-horizontal blanking end register storing a R (RED) signal from the RGB video signal from the microprocessor, a G-horizontal blanking end register storing a G (GREEN) signal from the RGB video signal from the microprocessor, and a B-horizontal blanking end register storing a B (BLUE) signal from the RGB video signal from the microprocessor. A first flip-flop controls the output of the R-horizontal blanking signal and receives R-horizontal blanking start signal from the R-horizontal blanking start register and the R-horizontal blanking end signal from the R-horizontal blanking end register. A second flip-flop controlling the output of the G-horizontal blanking signal and receives the G-horizontal blanking start signal from the G-horizontal blanking start register and the G-horizontal blanking end signal from the G-horizontal blanking end register. A third flip-flop controls the output of the B-horizontal blanking signal and receives the B-horizontal blanking start signal from the B-horizontal blanking start register and the B-horizontal blanking end signal from the B-horizontal blanking end register.

BRIEF DESCRIPTION OF THE DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein:

FIGS. 5A–5C illustrate various timing charts representing wave forms occurring at respective stages of the circuit shown in FIG. 3;

FIGS. 6A–6C illustrate various timing charts representing wave forms occurring at respective stages of the circuit shown in FIG. 4.

DETAILED DESCRIPTION OF THE INVENTION

Figure 1:
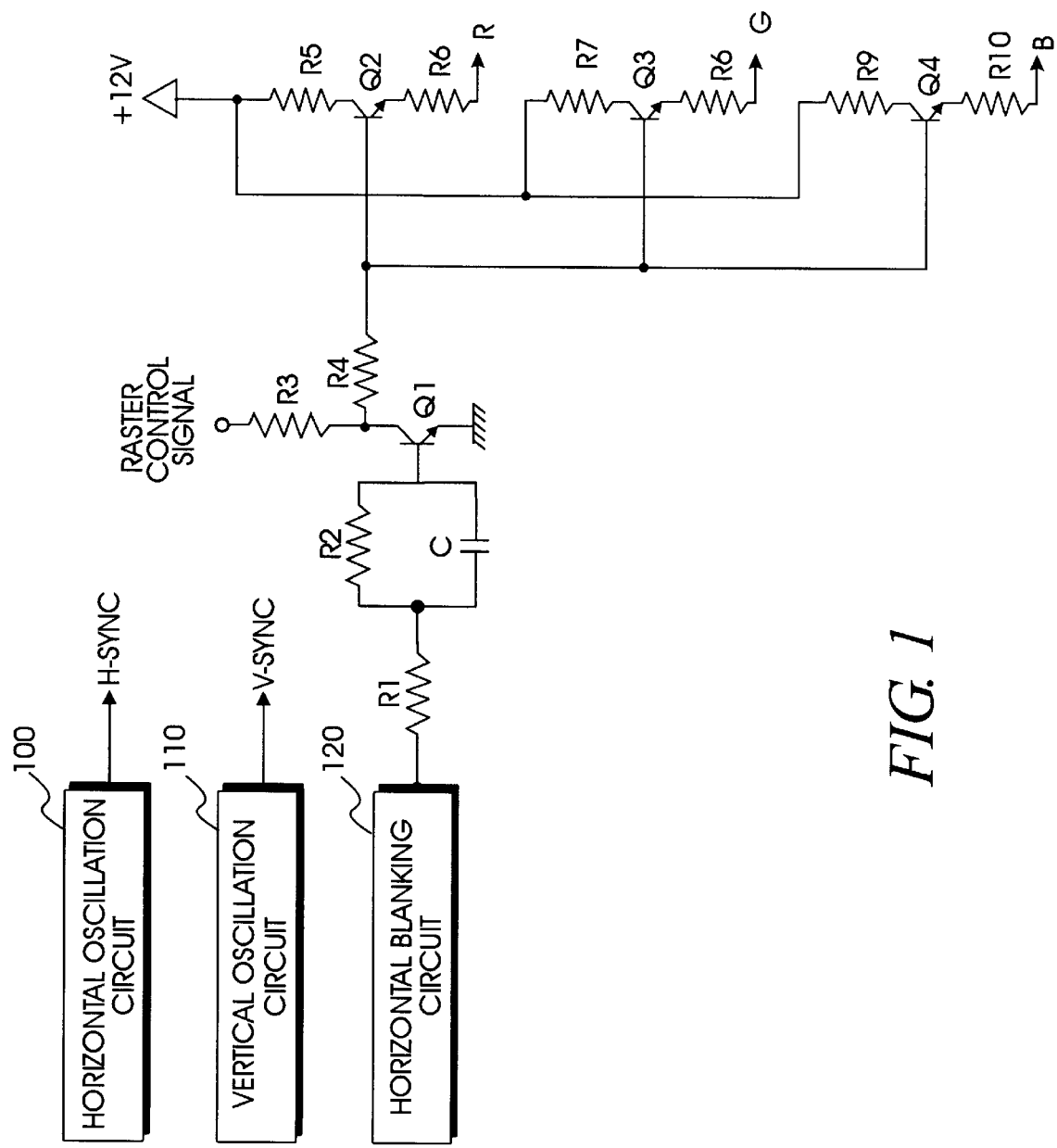
FIG. 1 is a block diagram of an abstract representation showing the salient features of a exemplary raster adjusting circuit in a monitor.

Turning now to the drawings, FIG. 1 illustrates an abstract representation of the salient features of an exemplar of a raster adjustment circuit conventionally employed to drive a monitor.

In the circuit represented by FIG. 1, once no signals for vertical and horizontal synchronization H-Sync/V-Sync and video signals R, G and B are supplied from a video signal generator (not shown) in a computer system, an output of horizontal oscillation circuit 100 is utilized to obtain a horizontal synchronizing signal H-Sync and an output of vertical oscillation circuit 110 is utilized to obtain a vertical synchronizing signal V-Sync for use in a monitor. A video signal may be adjusted by an on/off operation of transistor Q1, which is turned on or off by a sawtooth voltage applied from an output terminal of a horizontal blanking circuit 120 via resistor R1 and an integrator circuit of a resistor R2 and a capacitor C.

When transistor Q1 is turned on, a raster adjustment signal input via resistor R3 is fed to each of the base electrodes of transistors Q2, Q3 and Q4. A power-supply of a constant voltage (12 volts) is supplied in common to collector electrodes of each of transistor Q2, Q3 and Q4 via respective corresponding resistors R5, R7 and R9 so as to drive the transistors when their base electrodes are turned on. As a result, transistors Q2, Q3 and Q4, whose base electrodes are commonly connected to a collector electrode of transistor Q1 via resistor R4 so as to input a raster adjustment signal from an input terminal via serially connected resistors R3 and R4, are turned on concurrently, causing respective emitters of the transistors to output respective color component signals, namely red, green and blue (R, G and B,) video signals having substantially the same voltage level, thereby supplying a full white signal to an electron gun of a cathode ray tube CRT (not shown). In a monitor display employing such a conventional raster adjustment circuit, a full white signal output from the above described transistors Q2, Q3 and Q4 are adapted only to display a constant image on the screen of a cathode ray tube (CRT), resulting in a pictorial image being displayed that is unclear and imprecise. I have noticed therefore, it is not possible to adjust such a pictorial image currently being displayed or to form an image pattern by using such a raster adjustment circuit conventionally employed as described above. In addition, a monitor is designed to maintain a state of no signal when no video signals are input from a computer system. In a multi-mode monitor having a display power management system (DPMS), responsive to the status of multiple DPMS modes, a mode is sequentially shifted from a standby mode to a suspend mode and then an off mode. Consequently, when a power supply energizes the entire circuitry of a monitor which is supplied with no signal input from a video signal generator in a computer system, then an off mode may be maintained in a multi-mode monitor, otherwise a state of no-video signal would be maintained in a conventional monitor.

Figure 2:
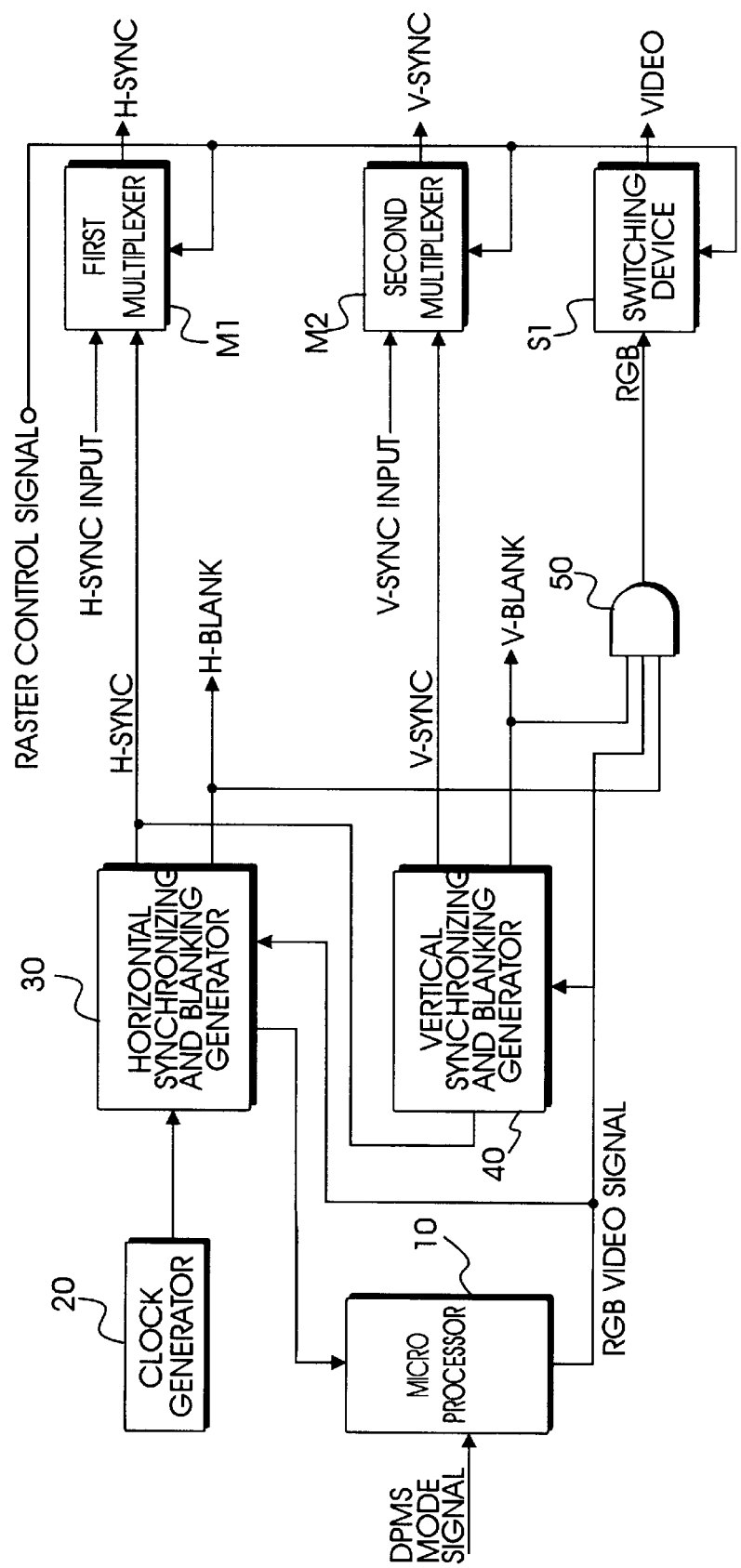
FIG. 2 is a block diagram of a raster controller constructed according to the principles of the present invention.

Referring now to FIG. 2, a schematic block diagram of a raster controller constructed according to the principles of present invention is shown. The circuit of FIG. 2 includes a microprocessor 10 storing a video signal having red, green and blue (R, G and B) components in an internal read only memory ROM (not separately shown), for inputting a respective mode signal of an individual display power management system (DPMS) supplied from a DPMS circuit (not shown) in a monitor. Clock generator 20 supplies a clock signal of constant period. Horizontal synchronizing and blanking signal generator 30 receives the clock signal from clock generator 20 and applies a horizontal synchronizing signal output to first multiplexer M1. Multiplexer M1 also receives a horizontal synchronizing signal from a video signal generator (not shown) in a computer system, in response to a raster control signal, and selectively generates a horizontal synchronizing signal, (H-SYNC). Vertical synchronizing and blanking signal generator 40 receives the horizontal synchronizing signal from the horizontal synchronizing and blanking signal generator 30 and a RGB video signal from microprocessor 10, and generates a vertical synchronizing signal and vertical blanking signal. Second multiplexor M2 receives the vertical synchronizing signal from vertical synchronizing and blanking signal generator 40 and a vertical synchronizing signal output from the video signal generator in the computer system, and in response to the raster control signal, selectively generates a vertical synchronizing signal V-SYNC. AND gate 50 receives at one input port the horizontal blanking signal from horizontal synchronizing and blanking signal generator 30 and at a second input port a vertical blanking signal output from vertical synchronizing and blanking signal generator 40 and at a third input port the RGB video signal from microprocessor 10 so as to perform a logic product operation. Switching device S1 receives the RGB video signal from AND gate 50, and in response to a raster control signal, switches the RGB output on and off.

Figure 3:
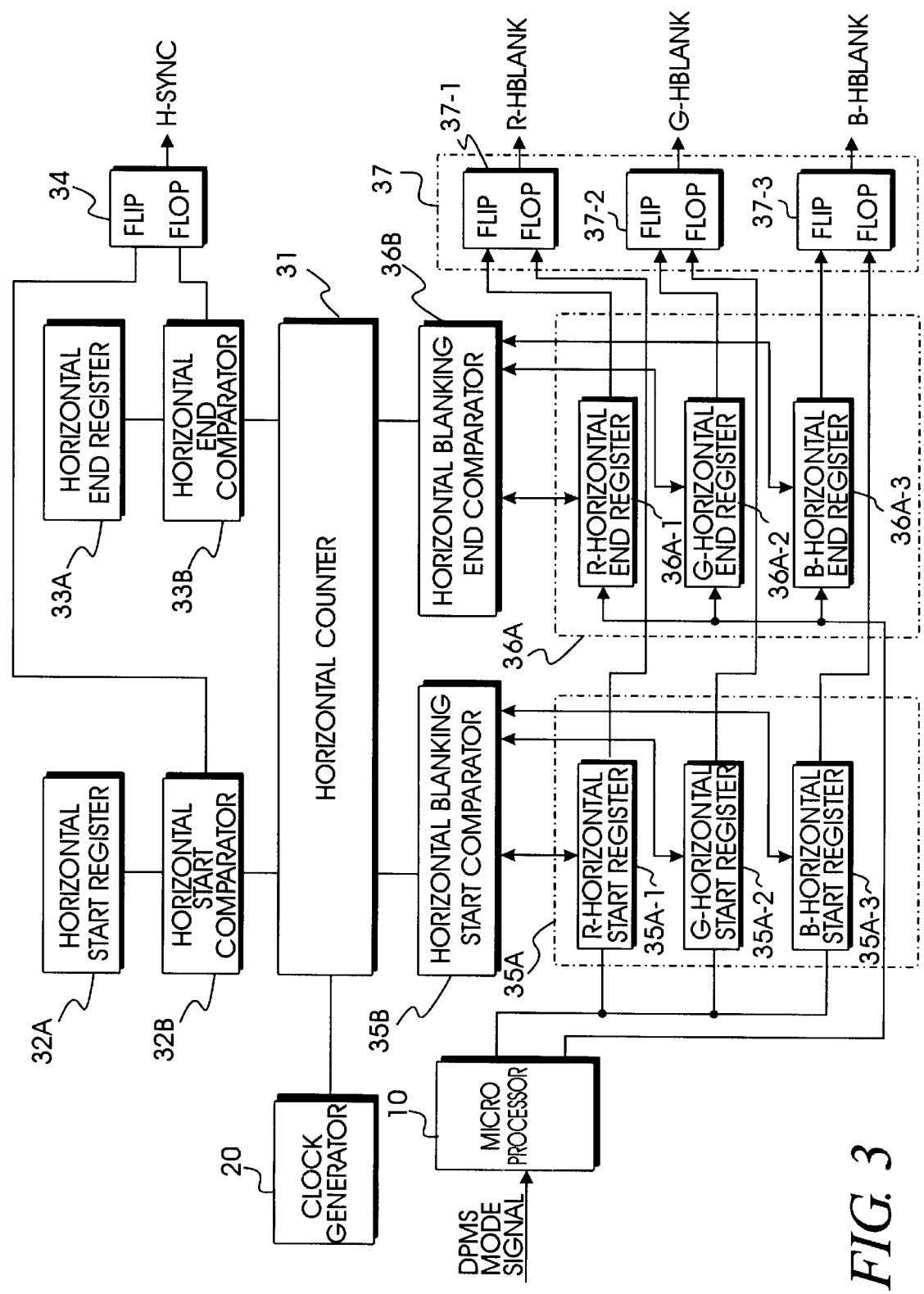
FIG. 3 is a block diagram illustrating a detailed configuration of the horizontal synchronizing and blanking signal generating stage shown in FIG. 2.

Now, by way of a non-limiting exemplar, horizontal synchronizing and blanking signal generator 30 and vertical synchronizing and blanking signal generator 40 will hereinafter be explained in greater detail. Now, however, a preferred embodiment of the present invention will be describe in detail. FIG. 3 is a detailed block diagram of the horizontal synchronizing and blanking generator 30 shown in FIG. 2.

Microprocessor 10 receives the DPMS mode signal and outputs the RGB video signal from the internal memory. A horizontal counter 31 counts clock pulses from clock generator 20 which generates the clock signal with a standard period. A horizontal start register 32A includes a horizontal synchronizing start signal. A horizontal start comparator 32B outputs a horizontal synchronizing start signal after comparing a horizontal count signal from said horizontal counter 31 to the horizontal synchronizing start signal from horizontal start register 32A. A horizontal end register 33A includes a horizontal synchronizing end signal. Horizontal end comparator 33B outputs a horizontal synchronizing end signal after comparing the horizontal count signal from horizontal counter 31 to the horizontal synchronizing end signal from horizontal end register 33A. A bistable multivibrator flip-flop 34 establishes an address area after getting the horizontal synchronizing end signal from horizontal end comparator 33B and the horizontal synchronizing start signal from horizontal start comparator 32B. A horizontal blanking start register 35A includes R, G, and B horizontal blanking start signals and receives the RGB video signal from microprocessor 10. Horizontal blanking start comparator 35B compares the horizontal count signal from horizontal counter 31 with R, G, and B horizontal blanking start signals from horizontal blanking start register 35A-1, 35A-2, and 35A-3 and stores the results of the comparison in horizontal blanking start register 35A-1, 35A-2, and 35A-3. Horizontal blanking end register 36A includes R, G, and B horizontal blanking end signals and receives the RGB video signal from microprocessor 10. A horizontal blanking end comparator 36B compares the horizontal count signal from horizontal counter 31 with R, G, and B horizontal blanking end signals from horizontal blanking end register 36A-1, 36A-2, and 36A-3 and stores the results of this comparison in horizontal blanking end register 36A-1, 36A-2, and 36A-3. Bistable multivibrator flip-flops 37-1, 37-2, and 37-3 control horizontal blanking of the RGB video signal and receive R, G, and B horizontal blanking start video signals from horizontal blanking start registers 35A-1, 35A and horizontal blanking end video signals from horizontal blanking end registers 36A-1, 36A-2, and 36A-3.

And now, a more detailed description of horizontal blanking start register 35A and horizontal blanking and register 36A and flip-flop 37 will be given. A horizontal blanking start register 35A may be constructed with a R-horizontal blanking start register 35A-1 receiving a R (RED) signal component from the RGB video signal being provided by microprocessor 10, a G-horizontal blanking start register 35A-2 receiving a G (GREEN) signal component from the RGB video signal being generated by microprocessor 10, and a B-horizontal blanking start register 35A-3 receiving a B (BLUE) signal component from the RGB video signal being generated by microprocessor 10. Horizontal blanking end register 36A includes a R-horizontal blanking end register 36A-1 receiving the R (RED) signal component from the RGB video signal being generated by microprocessor 10, a G-horizontal blanking end register 36A-2 getting the G (GREEN) signal component from the RGB video signal being generated by microprocessor 10, and a B-horizontal blanking end register 36A-3 receiving the B (BLUE) signal component from the RGB video signal being generated by microprocessor 10.

Flip-flop 37 may be constructed with a flip-flop 37-1 controlling the output of R-horizontal blanking signal R-HBLANK in response to receiving the R-horizontal blanking start signal from R-horizontal blanking start register 35A-1 and the R-horizontal blanking end signal from R-horizontal blanking end register 36A-1; a flip-flop 37-2 controlling the output of G-horizontal blanking signal G-HBLANK in response to receiving the G-horizontal blanking start signal from G-horizontal blanking start register 35A-2 and the G-horizontal blanking end signal from G-horizontal blanking end register 36A-2; and a flip-flop 37-3 controlling the output of B-horizontal blanking signal B-HBLANK in response to receiving the B-horizontal blanking start signal from B-horizontal blanking start register 35A-3 and the B-horizontal blanking end signal from B-horizontal blanking end register 36A-3.

Figure 4:
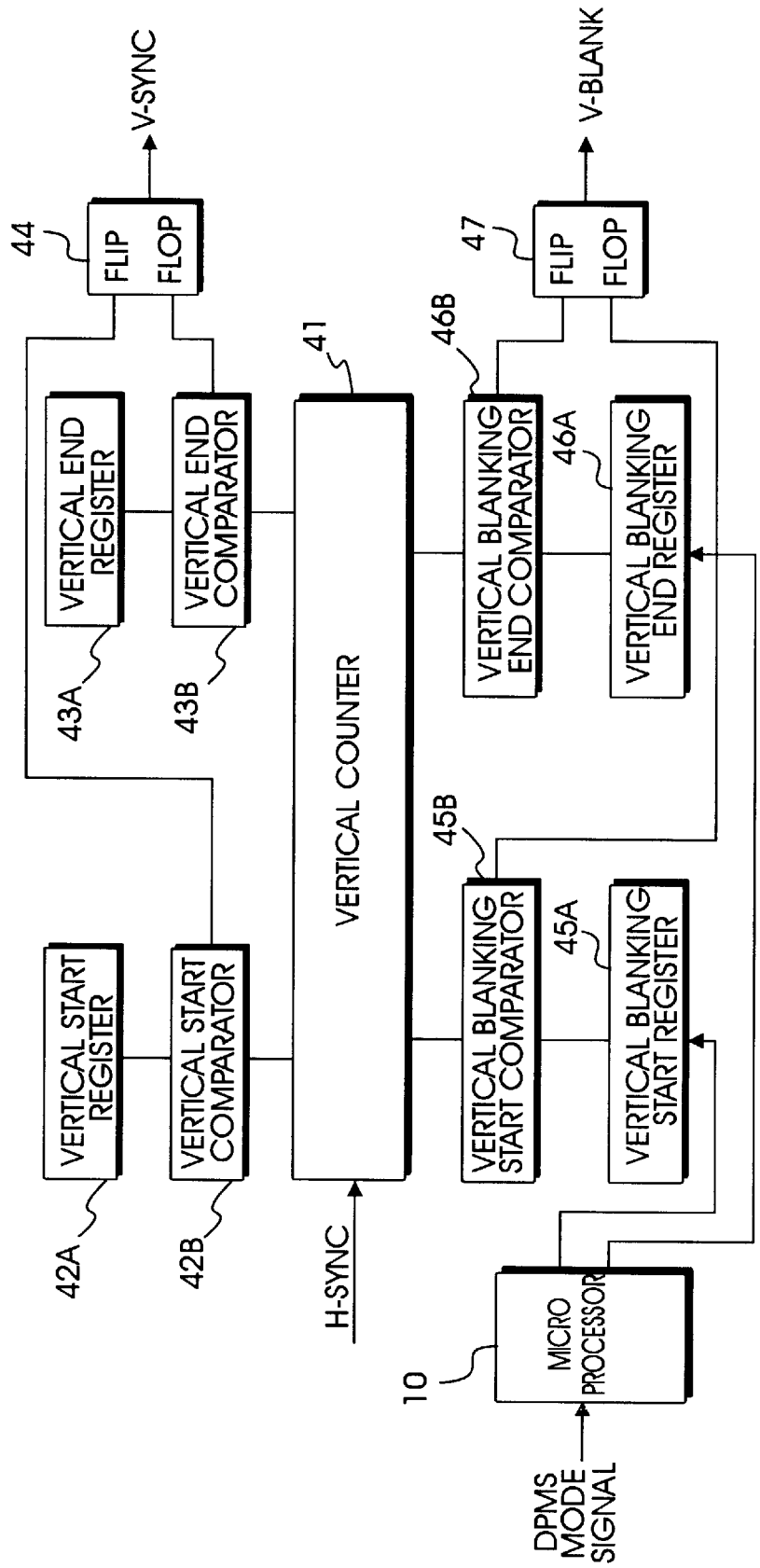
FIG. 4 is a block diagram illustrating a detailed configuration of the vertical synchronizing and blanking signal generating stage shown in FIG. 2.

Referring now to FIG. 4, vertical synchronizing and blanking generator 40 will be described. FIG. 4 is a detailed block diagram of the vertical synchronizing and blanking generator 40 shown in FIG. 2. Microprocessor 10 receives the DPMS mode signal and outputs the RGB video signal from its internal memory. A vertical counter 41 counts the horizontal synchronizing signal being input from said horizontal synchronizing and blanking generator 30 and outputs a vertical count signal. Vertical start register 42A includes a vertical synchronizing start signal. Vertical start comparator 42B outputs the vertical synchronizing start signal after comparing the vertical count signal from vertical counter 41 to the vertical synchronizing start signal from vertical start register 42A. Vertical end register 43A includes a vertical synchronizing end signal. Vertical comparator 43B outputs the vertical synchronizing end signal after comparing the vertical count signal from vertical counter 41 to the vertical synchronizing end signal in vertical end register 43A. Flip-flop 44 outputs a vertical sync signal V-SYNC after receiving the vertical synchronizing end signal from vertical end comparator 43B and the vertical synchronizing start signal from vertical start comparator 42B. Vertical blanking start register 45A includes a vertical blanking start signal and receives the RGB video signal from microprocessor 10. Vertical blanking start comparator 45B compares the vertical count signal from vertical counter 41 to the vertical blanking start signal from vertical blanking start register 45A, and when the result is a high logic level signal, outputs the RGB video signal from vertical blanking start register 45A.

Vertical blanking end register 46A includes a vertical blanking end signal and receives the RGB video signal from microprocessor 10. Vertical blanking end comparator 46B compares the vertical count signal from vertical counter 41 to the vertical blanking end signal from vertical blanking end register 46A, and when the result is a low logic level signal, cuts off the RGB video signal from vertical blanking end register 45A. Flip-flop 47 outputs a vertical blanking signal V-BLANK in response to the vertical blanking start and end signals from vertical blanking start comparator 45B and vertical blanking end comparator 46B.

Referring again to FIGS. 3 and 4, horizontal counter 31 inputs the clock signal from clock generator 20, and outputs count signal after counting clock pulses. Horizontal start comparator 32B receives the count signal from horizontal counter 31 and the horizontal synchronizing start signal from horizontal start register 32A including horizontal synchronizing start signal, and making a comparison, applies the horizontal synchronizing start signal to one input port of flip-flop 34. Horizontal end comparator 33B receives the count signal from horizontal counter 31 and the horizontal synchronizing end signal from horizontal end register 33A, and after comparing inputs, applies the horizontal synchronizing end signal to a second input port of flip-flop 34. Flip flop 34 receives the horizontal synchronizing start signal and the horizontal synchronizing end signal respectively from horizontal start comparator 32B and horizontal and comparator 33B, and on the basis of these inputs, controls the output of the horizontal synchronizing signal H-SYNC. For example, if the horizontal synchronizing start signal has a high logic level and the horizontal synchronizing end signal has a low logic level, flip-flop 34 will output the horizontal synchronizing signal H-SYNC. If on the contrary, the horizontal synchronizing start signal has a low logic level and horizontal synchronizing end signal has a high logic level, then flip-flop 34 will cut off transmission of the horizontal synchronizing signal H-SYNC.

Now, the operation of horizontal blanking signal generator 30 will be explained in greater detail. Respective data for an image adjustment operation performed in the process of manufacturing a monitor, for an image pattern with respect to both an image quality test and the individual display power management system (DPMS) mode are pre-stored in a memory such as a read only memory ROM for microprocessor 10. Microprocessor 10 outputs a different image pattern of pre-stored data, in response to a corresponding signal for an image adjustment image quality test and the individual display power management system (DPMS) mode. For instance, if an image quality test as well as an image adjustment operation are to be performed during the manufacturing process of a monitor, microprocessor 10 will output a RGB video signal for an image pattern required for the test and operation to horizontal synchronization and blanking signal generator 30. Horizontal blanking start register 35A in horizontal synchronization and blanking signal generator 30 is then fed with the red component signal (R) of the video signal at R-Horizontal blanking start register 35 A-1. R-Horizontal blanking start register 35A-1 has a red component signal R supplied from microprocessor 10 which in turn, is input to horizontal blanking start comparator 35B. Then, horizontal blanking start comparator 35B synchronizes the input signal R with a horizontal count signal input from horizontal counter 31 so as to output a synchronized signal as R Horizontal blanking start signal. R-Horizontal blanking end register 36A-1 provides a red component signal R supplied from the video signal provided by microprocessor 10, in turn to horizontal blanking end comparator 36B. As above explain, the R-horizontal blanking start signal from horizontal blanking start comparator 35B and R-horizontal blanking end signal from horizontal blanking end comparator 36B will be respectively stored in R-horizontal blanking start register 35A-1 and R-horizontal blanking end register 36A-1 and transmitted to flip-flop 37-1. Flip-flop 37-1 receives R-horizontal blanking start signal from horizontal blanking start register 35A-1 and R-horizontal blanking end signal from horizontal blanking end register 36A-1, and controls the output of the R-horizontal blanking signal (R-HBLANK).

For example, if the R-horizontal blanking start signal is at a high logic level and the R-horizontal blanking end signal is at a low logic level, flip-flop 37-1 will output the R-horizontal blanking signal (R-HBLANK). On the contrary, if the R-horizontal blanking start signal is at a low logic level and the R-horizontal blanking end signal is at a high logic level, flip-flop 37-1 will cut off transmission of the R-horizontal blanking signal (R-HBLANK).

The G signal component of the RGB video signal from microprocessor 10 is supplied to G-horizontal blanking start register 35A-2. G-horizontal blanking start register 36A-2 receives the G signal component from microprocessor 10, and outputs the G signal component to horizontal blanking start comparator 35B. Horizontal blanking start comparing portion 35B receives the G signal component from G-horizontal blanking start register 35A-2, and outputs the G horizontal blanking start signal after synchronizing the G signal component with the horizontal count signal from horizontal counter 31. Horizontal blanking end comparator 36B receives the G signal component from G-horizontal blanking end register 36A-2, and outputs the G horizontal blanking end signal after synchronizing the G signal component with the horizontal count signal from horizontal counter 31. As above explain, the G-horizontal blanking start signal from horizontal blanking start comparator 35B and the G-horizontal blanking end signal from horizontal blanking end compartor 36B will be stored respectively in G-horizontal blanking start register 35A-2 and G-horizontal blanking end register 36A-2, and transmitted to flip-flop 37-2. Flip-flop 37-2 receives the G-horizontal blanking start signal from horizontal blanking start register 35A-2 and the G-horizontal blanking end signal from horizontal blanking end register 36A-2, and on the basis of its reception of these signals, controls the output of the G-horizontal blanking signal (G-HBLANK). For example, if the G-horizontal blanking start signal is at a high logic level and the R-horizontal blanking end signal is at a low logic level, flip-flop 37-2 will output the G-horizontal blanking signal (G-HBLANK). If, on the contrary, the G-horizontal blanking start signal is at a low logic level and the G-horizontal blanking end signal is at a high logic level, flip-flop 37-2 will cut off and interrupt the transmission of the G-horizontal blanking signal (G-HBLANK).

B-Horizontal blanking start register 36A-3 receives a blue component signal (B) supplied from microprocessor 10 and, in turn, provides the B component signal to horizontal blanking start comparator 35B. Then, horizontal blanking start comparator 35B synchronizes the input B signal component with a horizontal count signal input from horizontal counter 31 so as to output a synchronized signal as the B-Horizontal blanking start signal. B-Horizontal blanking end register 36A-3 receives a blue component signal (B) supplied from microprocessor 10 and, in turn, outputs the input B component signal to horizontal blanking end comparator 36B. The B-horizontal blanking start signal from horizontal blanking start comparator 35B and the B-horizontal blanking end signal from horizontal blanking end comparator 36B will be stored respectively in B-horizontal blanking start register 35A-3 and in B-horizontal blanking end register 36A-3. Flip-flop 37-3 receives the B-horizontal blanking start signal from horizontal blanking start register 35A-3 and receives the B-horizontal blanking end signal from horizontal blanking end register 36A-3, and in response controls the output of the B-horizontal blanking signal (B-HBLANK). For example, if the B-horizontal blanking start signal is at a high logic level and the B-horizontal blanking end signal is at a low logic level, flip-flop 37-3 will output the B-horizontal blanking signal (B-HBLANK). If, on the contrary, the B-horizontal blanking start signal is at a low logic level and the B-horizontal blanking end signal is at a high logic level, flip-flop 37-3 will cutoff the transmission of the B-horizontal blanking signal (B-HBLANK).

As stated above, by separately processing a video signal output from microprocessor 10 according to the individual R, G, and B signal components, a monitor is able to display eight hues at maximum without receiving an external video signal input and vertical and horizontal synchronizing signals from a video signal generator in a computer system.

Referring now to FIGS. 5A–5C, a timing operation for horizontal synchronization and blanking signal generator 30 is illustrated. In FIGS. 5A–5C, a variety of timing charts corresponding to respective portions of the circuit shown in FIG. 3 are illustrated. In of FIG. 5A, respective addresses of the horizontal count signal corresponding to the horizontal blanking start signal HBSREG, horizontal start signal HSREG, horizontal end signal HEREG and horizontal blanking end signal HBEREG, respectively stored in corresponding horizontal start register 32A, horizontal end register 33A, horizontal blanking start register 35A and horizontal blanking end register 36A. In FIG. 5B, a pulse waveform of the horizontal synchronizing signal H-Sync is shown during the address generation time interval of the horizontal count signal. In addition, of FIG. 5C shows a pulse waveform of the horizontal blanking signal generated during the address generation of the horizontal count signal.

Here, the horizontal synchronizing signal (H-SYNC) output from horizontal synchronization and blanking signal generator 30 is supplied to vertical counter 41, in which the horizontal synchronizing input signal is counted so as to output a vertical count signal at its output terminal. A vertical count signal output from vertical counter 41 and a vertical start signal output from vertical start register 42A storing the vertical synchronizing start signal are collectively fed to vertical start comparator 42B. Then vertical start comparator 42B compares both the vertical count signal and the vertical synchronizing start signal so as to synchronize and output the vertical synchronizing start signal, to flip-flop 44.

A vertical count signal output from vertical counter 41 and a vertical end signal output from vertical end register 43A storing the vertical synchronizing end signal are collectively fed to vertical start comparator 43B. Then, vertical end comparator 43B compares input, the vertical count signal and the vertical synchronizing end signal so as to synchronize, and output the vertical synchronizing end signal, to flip-flop 44. Flip-flop 44, supplied with the vertical synchronizing start signal and the vertical synchronizing end signal output respectively from vertical start comparator 42B and vertical end comparator 43B, controls the vertical synchronizing signal output. For example, the where vertical synchronizing start signal has a high logic state and the vertical synchronizing end signal V-SYNC has a low logic state, flip-flop 44 then outputs a vertical synchronizing signal. If on the contrary, the vertical synchronizing start signal has a low logic level and vertical synchronizing end signal has a high logic level, then flip-flop 44 cuts off the vertical synchronizing signal output. A vertical blanking start register 45A is supplied with a video signal output from microprocessor 10, and then outputs the signal input to vertical blanking start comparator 45B. A video signal input from vertical blanking start register 45A is compared with a vertical count signal output from vertical counter 41, so as to be synchronized with each other, and then vertical blanking start comparator 45B outputs to flip-flop 47 the video vertical blanking start signal.

Vertical blanking end register 46A is supplied with a video signal output from microprocessor 10, and then outputs the signal input to vertical blanking end comparator 46B. A video signal input from vertical blanking end register 46A is compared with a vertical count signal output from vertical counter 41, so as to be synchronized with each other, and then vertical blanking end comparator 46B outputs to flip-flop 47 the video vertical blanking end signal.

Flip-flop 47 supplied with the vertical blanking start signal and the vertical blanking end signal output from respective vertical blanking start comparator 45B and vertical blanking end comparator 46B, outputs a vertical blanking signal (V-BLANK). For example, where vertical blanking start signal is of a high state and vertical blanking end signal is of a low state, flip-flop 47 outputs the vertical blanking signal. If on the contrary, the vertical blanking start signal is of a low logic level and vertical blanking end signal is of a high logic level, then flip-flop 47 cuts off a vertical blanking signal output.

Referring now to FIGS. 6A–6C, a timing operation of vertical synchronization and blanking signal generating means 40 is illustrated. In FIGS. 6A–6C, a variety of timing charts corresponding to respective portion as shown in FIG. 4 is illustrated. In FIG. 6A, respective addresses of vertical count signal corresponding to vertical blanking start signal VBSREG, vertical start signal VSREG, vertical end signal VEREG and vertical blanking end signal VBEREG, respectively stored in corresponding vertical start register 42A, vertical and register 43A, vertical blanking start register 45A and vertical blanking end register portion 46A. In FIG. 6B, a pulse waveform of the vertical synchronizing signal V-Sync during the address generation time interval of vertical count signal. In addition, FIG. 6C shows a pulse waveform of the vertical blanking signal generated during the address generation of vertical count signal. Referring again to FIG. 2, the horizontal synchronizing signal from horizontal synchronizing and blanking generator 30 is fed to first multiplexor M1 and the vertical synchronizing signal is fed to second multiplexor M2. The horizontal blanking signal from horizontal synchronizing and blanking generator 30 and the vertical blanking signal from vertical synchronizing and blanking generator 40, and the RGB video signal from microprocessor 10 is fed to AND gate 50. AND gate 50 outputs the RGB video signal when the horizontal blanking signal and the vertical blanking signal are all in a high logic state. When the raster control signal is input, multiplexor M1 receives the horizontal synchronizing signal from horizontal synchronizing and blanking generator 30 and the horizontal synchronizing signal from a video signal generator (not shown) in the computer and outputs the horizontal synchronizing signal from horizontal synchronizing and blanking generator 30. Likewise multiplexer M2 receives the vertical synchronizing signal from vertical synchronizing and blanking generator 40 and the vertical synchronizing signal from the video signal generator in the computer and outputs the vertical synchronizing signal from vertical synchronizing and blanking generator 40. When the raster control signal is input, switching element S1 is turned on and then the RGB video signal will be output from AND gate 50 will be output. A display pattern signal is output as the RGB video signal when the switching element S1 is turned on. During the DPMS mode in the monitor, wherein microprocessor 10 stores some patterns as Normal mode, Stand-By mode, Suspend mode, and Offmode, one display pattern will be output as a present DPMS mode.

For example, microprocessor 10 outputs a display pattern signal in accordance with a stand by mode signal to horizontal synchronizing and blanking signal generator 30 and vertical synchronizing and blanking signal generator means 40, and applying to switching device S1.

The monitor displays the display pattern signal in accordance with the stand by mode signal in the cathode ray tube CRT and amplifying via video amplification. In addition, a display pattern signal in accordance to Suspend Mode be displayed on the cathode ray tube CRT. In addition, to test an image adjustment an image quality test is performed without RGB video signal output from the computer or video signal generator while it controls the monitor for making full white video mode pattern and color video pattern of adapted mode via AND gate 50.

Figure 7:
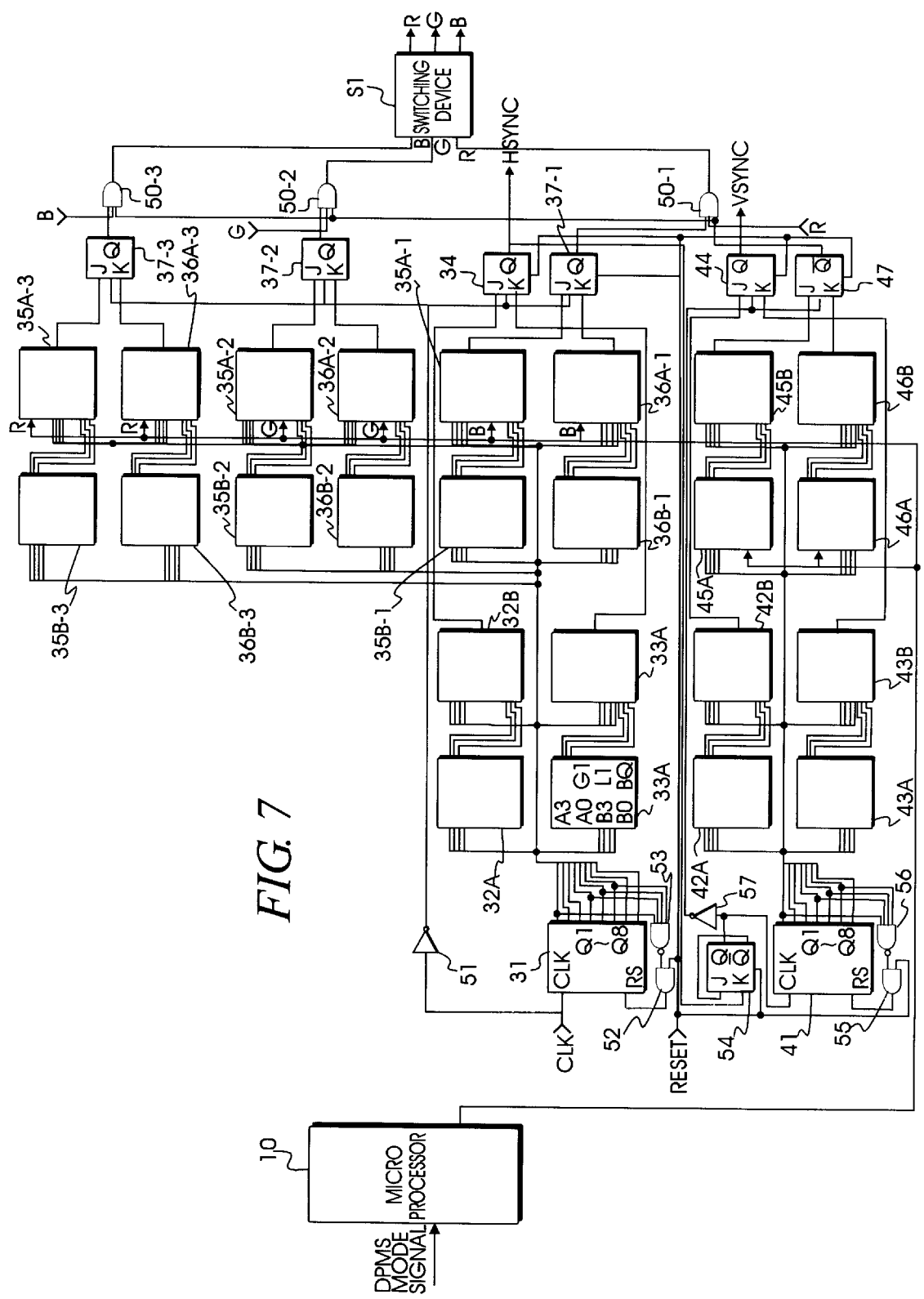
FIG. 7 is a schematic circuit diagram combining the elements of FIGS. 2–4 to illustrate a preferred embodiment of a raster controller constructed according to the principles of the present invention.

FIG. 7 is a schematic circuit diagram illustrating one preferred embodiment of a raster controller according to the principle of the present invention, in which microprocessor 10 including a read only memory ROM having a RGB video signal stored therein, and receiving a display power management signaling signal from a display power management signaling circuit in the monitor a clock signal CLK output from clock generator 20 is connected to clock terminal CLK of horizontal counter 31 and to flip flop 34 and flip flops 37-1, 37-2 and 37-3 via inverter 51. Output terminals of counter 31 are to input terminals of horizontal start register 32A, horizontal end register 33A, horizontal start comparator 33B, horizontal end comparator 33B and horizontal blanking start registers 35A-1,35A-2.35A-3. Horizontal blanking end registers 36A-1,36A-2,36A-3, horizontal blanking start comparators 35B-1, 35B-2, 35B-3, and horizontal blanking end comparators 35B-1, 35B-2, 35B-3. The output terminals of horizontal start register 32A and horizontal end register 33A are respectively connected to the input terminals of horizontal start comparator 32B and horizontal end comparator 33B. The output terminals of horizontal start comparator 32B and horizontal end comparator 33B are respectively connected to the input terminals J, K of flip flop 34. The output terminals of horizontal blanking start registers 35A-1. 35A-2, 35A-3 and horizontal blanking end registers 36A-1, 36A-2, 36A-3 are respectively connected to the input terminals of horizontal blanking start comparators 35B-1, 35B-2, 35B-3 and horizontal blanking end comparators 36B-1, 36B-2, 36B-3. R, G and B horizontal blanking signals output via the inverting output terminals $\overline{Q}$ of flip flops 37-1, 37-2 and 37-3 are connected to a one input terminal of AND gates 50-1, 50-2, 50-3. The output terminal Q1, Q5, Q6 and Q7 of vertical counter 31 are input to NOR gate 53. The output terminal Q of flip flop 34 is connected to the input terminal K of flip flop 54, the output terminal Q of flip flop 54 is connected to flip flop 44 and flip flop 47 via inverter 57 and connected to the clock terminal of vertical counter 41. The output terminals of counter 41 are connected to vertical start register 42A, vertical end register 43A, vertical start comparator 42B, vertical end comparator 43B, and vertical blanking start register 45A, vertical blanking end register 46A, vertical blanking start comparator 45B, vertical blanking end comparator 46B. The output terminals of vertical start register 42A and vertical end register 43A are respectively connected to the input terminals of vertical start comparator 42B and vertical end comparator 43B. The output terminals of vertical start comparator 42B and vertical end comparator 43B are respectively connected to the input terminals J and K of flip flop 44. The output terminals of vertical blanking start register 45A and vertical blanking end register 46A are respectively connected to the input terminals of vertical blanking start comparator 45B and vertical blanking end comparator 46B. The output terminals of vertical blanking start comparator 45B and vertical blanking end comparator 46B are respectively connected to the input terminals J and K of flip flop 47. A vertical synchronizing signal V-SYNC is output via the output terminal Q of flip flop 44. A vertical blanking signal output via the inverting terminal $\overline{Q}$ of flip flop 47 is connected to another input terminal of AND gates 50-1, 50-2, 50-3. AND gates 50-1, 50-2, 50-3 respectively output video signals R, G, B received at a third input terminal from microprocessor 10.

Output terminals of vertical counter 41 are connected to one input of AND gate 55 via NOR gate 56 and the output of NOR gate 56 which is connected to the reset terminal RESET of said vertical counter 41. A system reset signal RESET is connected to another input terminal of AND gates 52 and 55. The operation of the invention is further explained as follows. First, when the video signal generator outputs a RGB video signal to the monitor, the raster controlling circuit should not select the horizontal synchronizing signal H-SYNC output from horizontal synchronizing and blanking generator 30 nor the vertical synchronizing signal V-SYNC output from vertical synchronizing and blanking generator 30 via first multiplexor M1 and second multiplexor M2, but respectively, instead select the horizontal synchronizing signal H-SYNC INPUT and vertical synchronizing signal V-SYNC INPUT output from the video signal generator in the computer. Although, if the video signal generator does not output a RGB video signal to the monitor, the raster controlling circuit selects the horizontal synchronizing signal H-SYNC output from horizontal synchronizing and blanking generator 30 and the vertical synchronizing signal V-SYNC output from vertical synchronzing and blanking generator 40 via first multiplexor M1 and second multiplexor M2 respectively.

While there have been illustrated and described what are considered to be embodiments of the present invention, it will be understood by those skilled in the art that various changes and modifications may be make, and equivalents may he substituted for elements thereof without departing from the true scope of the present invention. In addition, many modifications may be made to adopt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments failing within the scope of the appended claims.

What is claimed is:

1. A raster controller for displaying image patterns on a display device according to respective modes of a display power management system signal generated by a display power management system circuit, comprising:

a microprocessor having red, green and blue video data stored therein, said microprocessor outputting red, green and blue (RGB) video data in response to said display power management system signal corresponding to one of said respective modes;

a clock generator for generating a constant clock signal;

a horizontal synchronizing and blanking signal generator responsive to said clock signal and said RGB video data for generating a horizontal synchronizing signal and a horizontal blanking signals;

a vertical synchronizing and blanking signal generator responsive to said RGB video data and said horizontal synchronizing signal for generating a vertical synchronizing signal and a vertical blanking signal;

AND gate means responsive having a first input connected to receive said horizontal blanking signal, a second input connected to receive said vertical blanking signal and a third input connected to receive said RGB video data;

first multiplexer means responsive to a raster control signal for selectively outputting one of a horizontal synchronizing signal input from a computer system and said horizontal synchronizing signal input from said horizontal synchronizing and blanking signal generator;

second multiplexer means responsive to said raster control signal for selectively outputting one of a vertical synchronizing signal input from a computer system and said vertical synchronizing signal input from said horizontal synchronizing and blanking signal generator; and switching means for selectively outputting said RGB video data for display as one of said image patterns, when output from said AND gate means, in response to said raster control.

2. The raster controller as set forth in claim 1, wherein said horizontal synchronizing and blanking signal generator comprises:

a horizontal start register having a horizontal start signal stored therein;

a horizontal end register having a horizontal end signal stored therein;

a horizontal counter for generating a horizontal count signal by counting pulses of said clock signal;

a horizontal start comparator for generating a horizontal synchronizing start signal as a result achieved by comparing said horizontal start signal to said horizontal count signal;

a horizontal end comparator for generating a horizontal synchronizing end signal as a result achieved by comparing said horizontal end signal to said horizontal count signal;

first flip-flop means for generating said horizontal synchronizing signal in response to said horizontal synchronizing start signal and said horizontal synchronizing end signal;

horizontal blanking start register means, having R, G and B horizontal blanking start signals stored therein, for receiving said RGB video data output from said microprocessor and outputting said R, G and B horizontal blanking start signals in response thereto;

horizontal blanking end register means, having R, G and B horizontal blanking end signals stored therein, for receiving said RGB video data output from said microprocessor and outputting said R, G and B horizontal blanking end signals in response thereto;

horizontal blanking start comparator means for comparing said horizontal count signal to said R, G and B horizontal blanking start signals output from said horizontal blanking start register means and for storing results of said comparing into said horizontal blanking start register means;

horizontal blanking end comparator means for comparing said horizontal count signal to said R, G and B horizontal blanking end signals output from said horizontal blanking end register means and for storing results of said comparing into said horizontal blanking end register means; and second flip-flop means for generating said horizontal blanking signals in response to said results stored in said horizontal blanking start register means and said horizontal blanking end register means.

3. The raster controller as set forth in claim 1, wherein said vertical synchronizing and blanking signal generator comprises:

a vertical start register having a vertical start signal stored therein;

a vertical end register having a vertical end signal stored therein;

a vertical counter for generating a vertical count signal by counting each said horizontal synchronizing signal during a predetermined period;

a vertical start comparator for generating a vertical synchronizing start signal as a result achieved by comparing said vertical start signal to said vertical count signal;

a vertical end comparator for generating a vertical synchronizing end signal as a result achieved by comparing said vertical end signal to said vertical count signal;

vertical blanking start register having a vertical blanking start signal stored therein, said vertical blanking start register outputting said vertical blanking start signal in response to said RGB video data output from said microprocessor;

a vertical blanking end register having a vertical blanking end signal stored therein, said vertical blanking end register outputting said vertical blanking end signal in response to said RGB video data output from said microprocessor;

a vertical blanking start comparator for outputting a first signal by comparing said vertical count signal to said vertical blanking start signal;

a vertical blanking end comparator for outputting a second signal by comparing said vertical count signal to said vertical blanking end signal;

first flip-flop means for generating said vertical synchronizing signal in response to said vertical synchronizing start and end signals; and second flip-flop means for generating said vertical blanking signal in response to said first and second signals output from said vertical blanking start and end comparators.

4. The raster controller as set forth in claim 2, wherein said vertical synchronizing and blanking signal generator comprises:

a vertical start register having a vertical start signal stored therein;

a vertical end register having a vertical end signal stored therein;

a vertical counter for generating a vertical count signal by counting each said horizontal synchronizing signal during a predetermined period;

a vertical start comparator for generating a vertical synchronizing start signal as a result achieved by comparing said vertical start signal to said vertical count signal;

a vertical end comparator for generating a vertical synchronizing end signal as a result achieved by comparing said vertical end signal to said vertical count signal;

a vertical blanking start register having a vertical blanking start signal stored therein, said vertical blanking start register outputting said vertical blanking start signal in response to said RGB video data output from said microprocessor;

a vertical blanking end register having a vertical blanking end signal stored therein, said vertical blanking end register outputting said vertical blanking end signal in response to said RGB video data output from said microprocessor;

a vertical blanking start comparator for outputting a first signal by comparing said vertical count signal to said vertical blanking start signal;

a vertical blanking end comparator for outputting a second signal by comparing said vertical count signal to said vertical blanking end signal;

third flip-flop means for generating said vertical synchronizing signal in response to said vertical synchronizing start and end signals; and fourth flip-flop means for generating said vertical blanking signal in response to said first and second signals output from said vertical blanking start and end comparators.

5. The raster controller as set forth in claim 3, wherein said horizontal synchronizing and blanking signal generator comprises:

a horizontal start register having a horizontal start signal stored therein;

a horizontal end register having a horizontal end signal stored therein;

a horizontal counter for generating a horizontal count signal by counting pulses of said clock signal;

a horizontal start comparator for generating a horizontal synchronizing start signal as a result achieved by comparing said horizontal start signal to said horizontal count signal;

a horizontal end comparator for generating a horizontal synchronizing end signal as a result achieved by comparing said horizontal end signal to said horizontal count signal;

third flip-flop means for generating said horizontal synchronizing signal in response to said horizontal synchronizing start signal and said horizontal synchronizing end signal;

horizontal blanking start register means, having R, G and B horizontal blanking start signals stored therein, for receiving said RGB video data output from said microprocessor and outputting said R, G and B horizontal blanking start signals in response thereto;

horizontal blanking end register means, having R, G and B horizontal blanking end signals stored therein, for receiving said RGB video data output from said microprocessor and outputting said R, G and B horizontal blanking end signals in response thereto;

horizontal blanking start comparator means for comparing said horizontal count signal to said R, G and B horizontal blanking start signals output from said horizontal blanking start register means and for storing results of said comparing into said horizontal blanking start register means;

horizontal blanking end comparator means for comparing said horizontal count signal to said R, G and B horizontal blanking end signals output from said horizontal blanking end register means and for storing results of said comparing into said horizontal blanking end register means; and fourth flip-flop means for generating said horizontal blanking signals in response to said results stored in said horizontal blanking start register means and said horizontal blanking end register means.

6. The raster controller as set forth in claim 4, further comprising:

first reset means responsive to a predetermined count output from said horizontal counter and a reset signal for resetting said horizontal counter; and second reset means responsive to a predetermined count output from said vertical counter and said reset signal for resetting said vertical counter.

7. The raster controller as set forth in claim 6, wherein said first reset means comprises:

a NAND gate connected to predetermined count output terminals of said horizontal counter; and an AND gate having a first input connected to an output of said NAND gate, a second input connected to receive said reset signal and an output connected to a reset terminal of said horizontal counter.

8. The raster controller as set forth in claim 6, wherein said second reset means comprises:

a NAND gate connected to predetermined count output terminals of said vertical counter; and an AND gate having a first input connected to an output of said NAND gate, a second input connected to receive said reset signal and an output connected to a reset terminal of said vertical counter.

* * * * *